(12) United States Patent
Slezák et al.

(10) Patent No.: US 12,372,122 B2
(45) Date of Patent: Jul. 29, 2025

(54) CLUTCH ASSEMBLY COMPRISING SWITCHABLE FREEWHEEL AND DRIVETRAIN COMPRISING THE CLUTCH ASSEMBLY

(71) Applicant: Schaeffler Technologies AG & Co. KG, Herzogenaurach (DE)

(72) Inventors: Luboslav Slezák, Podbranc (SK); Erik Orel, Skalica (SK)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/719,067

(22) PCT Filed: Oct. 25, 2022

(86) PCT No.: PCT/DE2022/100788
§ 371 (c)(1),
(2) Date: Jun. 12, 2024

(87) PCT Pub. No.: WO2023/109999
PCT Pub. Date: Jun. 22, 2023

(65) Prior Publication Data
US 2025/0043833 A1    Feb. 6, 2025

(30) Foreign Application Priority Data

Dec. 15, 2021 (DE) .......................... 102021133208.7

(51) Int. Cl.
*F16D 41/04* (2006.01)
*F16D 11/00* (2006.01)
(Continued)

(52) U.S. Cl.
CPC .............. *F16D 41/04* (2013.01); *F16D 11/14* (2013.01); *F16D 41/125* (2013.01); *F16D 41/14* (2013.01); *F16D 2011/002* (2013.01)

(58) Field of Classification Search
CPC ........ F16D 41/04; F16D 41/12; F16D 41/125; F16D 41/14; F16D 2011/002; F16D 11/10; F16D 11/14; F16D 47/04
See application file for complete search history.

(56) References Cited

U.S. PATENT DOCUMENTS

2020/0263742 A1* 8/2020 Burke ..................... F16D 41/06
2022/0397164 A1* 12/2022 Geiser .................... F16D 41/12

FOREIGN PATENT DOCUMENTS

DE         888340 C    8/1953
DE   102017128198 A1   6/2018
(Continued)

*Primary Examiner* — Richard M Lorence
(74) *Attorney, Agent, or Firm* — Price Heneveld LLP (57) ABSTRACT

A clutch assembly comprises: first and second clutch partners; a switchable freewheel arranged between the first and second clutch partners, wherein the freewheel comprises a plurality of spring-loaded blocking bodies which are circumferentially fixed to the first clutch partner and selectively interact with a blocking contour arranged on the second clutch partner; a sliding sleeve for controlling the clutch assembly, wherein, in a blocking position of the sliding sleeve, the two clutch partners are interconnected for conjoint rotation in one direction of rotation and in the opposite direction of rotation via the sliding sleeve, and in a freewheeling position of the sliding sleeve, the two clutch partners are interconnected for conjoint rotation in precisely one direction of rotation via the freewheel.

19 Claims, 5 Drawing Sheets

(51) Int. Cl.
*F16D 11/14* (2006.01)
*F16D 41/12* (2006.01)
*F16D 41/14* (2006.01)

(56) References Cited

FOREIGN PATENT DOCUMENTS

DE 102018101148 A1 8/2018
WO 2022260873 A1 12/2022

* cited by examiner

CLUTCH ASSEMBLY COMPRISING SWITCHABLE FREEWHEEL AND DRIVETRAIN COMPRISING THE CLUTCH ASSEMBLY

CROSS-REFERENCE TO RELATED APPLICATIONS

This application is a U.S. national stage application under 35 U.S.C. § 371 that claims the benefit of priority under 35 U.S.C. § 365 of International Patent Application No. PCT/DE2022/100788, filed on Oct. 25, 2022, designating the United States of America, which in turn claims the benefit of priority under 35 U.S.C. §§ 119, 365 of German Patent Application No. 102021133208.7, filed Dec. 15, 2021, the contents of which are relied upon and incorporated herein by reference in their entirety.

FIELD OF THE DISCLOSURE

The disclosure relates to a clutch assembly. The disclosure further relates to a drivetrain having the clutch assembly.

BACKGROUND OF THE DISCLOSURE

Switchable overrunning clutches are known which are used to couple rotatable components, such as shafts. The clutches can be equipped with a controllable freewheel for selective torque transmission between the torque-transmitting components. The overrunning clutches can usually be controlled with an electrical, mechanical or hydraulic drive.

Document DE 10 2018 101 148 A1 describes a switchable clutch which has an outer ring, an inner ring, a roller cage, a plurality of rollers and a driver plate. The outer ring has a plurality of ramp-shaped surfaces. The roller cage is arranged radially between the outer ring and the inner ring. The rollers are guided through the roller cage. The driver plate is fastened to the inner ring in a rotationally fixed manner and can engage with the roller cage to rotate the rollers with respect to the outer ring. In an exemplary embodiment, the switchable clutch has a spring which engages with the outer ring and is used to preload the roller cage in a first direction of rotation relative to the outer ring. In an exemplary embodiment, the switchable clutch has an electromagnet that engages with the driver plate and the roller cage, and/or a coil spring unit for releasing the driver plate and the roller cage.

SUMMARY OF THE DISCLOSURE

The subject matter of the disclosure is a clutch assembly suitable for a drivetrain of a vehicle. The clutch assembly is used in particular to connect or disconnect a drive axle of the vehicle. Preferably, the clutch assembly is designed as a dog clutch, preferably as a disconnecting clutch.

The clutch assembly has a first clutch partner and a second clutch partner. The clutch partners can be rotated about a common main axis of rotation. Preferably, the first clutch partner can be and/or is connected in a torque-transmitting manner to a first rotating component, for example a first shaft, and the second clutch partner can be and/or is connected in a torque-transmitting manner to a second rotating component, for example a second shaft. The two clutch partners are preferably arranged coaxially and/or concentrically with respect to the main axis of rotation. For example, the first clutch partner is designed as a hub and the second clutch partner as a coupling body, in particular a ratchet ring.

The clutch assembly has a switchable freewheel. The freewheel is arranged between the first and the second clutch partners in order to couple the two clutch partners to one another according to the direction of rotation. In particular, the freewheel can be connected or disconnected mechanically. When connected, the freewheel transmits torque between the two clutch partners according to the direction of rotation. When disconnected, the first and second clutch partners are either coupled to one another or decoupled from one another, regardless of the freewheel.

The freewheel has a plurality of spring-loaded blocking bodies, which are fixed at least in the circumferential direction on the one clutch partner and interact form-fittingly with a ramp-shaped blocking contour arranged on the other clutch partner according to the direction of rotation. When the freewheel is connected, the blocking bodies engage preferably form-fittingly in the blocking contour in a fixed direction of rotation, and slide off the blocking contour in an opposite direction of rotation directed counter to the direction of rotation. The blocking contour is preferably formed by a circumferential toothed ramp geometry, in particular a sawtooth ramp. The blocking bodies are preferably designed as axially movable pawls.

Within the scope of the disclosure, the clutch assembly may have a sliding sleeve which is arranged coaxially with respect to the two clutch partners and which is designed and/or is suitable for controlling the freewheel. The sliding sleeve is preferably movable in the axial direction with respect to the axis of rotation relative to the two clutch partners and is or can be connected to the first and/or second clutch partner in a rotationally fixed manner in the circumferential direction. In particular, the two clutch partners are or can be received radially within the sliding sleeve. Optionally, the sliding sleeve can have a groove running in the circumferential direction on its outer circumference for connecting an actuator. In particular, the groove is used to receive a shift fork, in particular to receive a sliding block. The sliding sleeve is movable in the axial direction with respect to the main axis of rotation between a blocking position, a freewheeling position and a neutral position. In particular, the sliding sleeve is movable in an axial direction relative to the main axis of rotation from the blocking position to the freewheeling position and then to the neutral position and in reverse order in an axial opposite direction.

In the blocking position, the two clutch partners are connected to one another in a rotationally fixed manner in one direction of rotation and in an opposite direction of rotation via the sliding sleeve. In particular, in the blocking position, the sliding sleeve form-fittingly engages with the first clutch partner and the second clutch partner in the circumferential direction in order to connect the two clutch partners to one another in a rotationally fixed manner during rotation in the direction of rotation and the opposite direction of rotation. By axially moving the sliding sleeve into the freewheeling position, the rotationally fixed connection between the two clutch partners is at least partially canceled.

In the freewheeling position, the two clutch partners are connected to one another in a rotationally fixed manner via the freewheel in exactly one direction of rotation. In particular, in the freewheeling position, the blocking bodies form-fittingly engage with the first clutch partner and the second clutch partner in the direction of rotation in order to connect the two clutch partners to one another in a rotationally fixed manner during rotation in the direction of rotation. In contrast, the two clutch partners can be rotated relative to one another when rotating in an opposite direction of rotation or one of the two clutch partners remains stationary.

The freewheel is disconnected by axially moving the sliding sleeve into the neutral position.

In the neutral position, the blocking bodies are kept disengaged with respect to the blocking contour by the sliding sleeve, such that the two clutch partners can be rotated relative to one another in the direction of rotation and in the opposite direction of rotation. In particular, the sliding sleeve is coupled for movement to the blocking bodies in such a way that they are moved away from the blocking contour when the sliding sleeve is axially moved. By axially moving the sliding sleeve into the neutral position, the rotationally fixed connection between the two clutch partners is completely canceled.

The advantage of the disclosure is in particular that a clutch assembly is proposed which is characterized by simple actuation, in particular which can be switched under load, due to the axial movement of the shift sleeve. By actuating the freewheel via the sliding sleeve, an additional actuator for the freewheel can also be dispensed with, so the clutch assembly requires significantly fewer components and at the same time can be designed to be particularly cost-effective. Another advantage is that the clutch assembly can be designed to be particularly robust and is suitable for transmitting high torques.

In a specific embodiment, the freewheel is arranged in the axial direction with respect to a main axis of rotation between the two clutch partners. For this purpose, the first clutch partner has a plurality of receiving pockets on an axial end face for receiving the blocking bodies, and the second clutch partner has the blocking contour on an axial end face opposite the blocking bodies. In particular, the blocking bodies are received in a retractable manner within the receiving pockets. The receiving pockets preferably form a negative contour of the blocking bodies, such that the blocking bodies are received in the receiving pocket form-fittingly and/or in a precisely fitting manner, at least in the circumferential direction. The blocking bodies are movably guided in the receiving pocket in the axial direction. Each of the blocking bodies is preferably supported in the associated receiving pocket via a spring, such that a spring force is applied to the blocking bodies in the axial direction in relation to the main axis of rotation or in the direction of the blocking contour. When connected, the blocking bodies are partially removed from the receiving pocket, such that they are in torque-transmitting engagement with the blocking contour on the one hand and with the receiving pocket on the other. When disconnected, the blocking bodies are completely or largely inserted into the receiving pocket, such that they are arranged disengaged or spaced with respect to the blocking contour. Owing to the axial arrangement of the freewheel between the two clutch partners, the blocking bodies can be easily inserted into or removed from the receiving pockets by the axial movement of the sliding sleeve. This means that there is no need for complex mechanics to translate the movement of the sliding sleeve onto the blocking bodies.

In a further embodiment, the freewheel has a control ring which is coupled for movement to the sliding sleeve. The control ring rests against the blocking bodies in an axial direction with respect to the main axis of rotation against a spring force in order to transmit an axial movement of the sliding sleeve to the blocking bodies. In particular, the sliding sleeve is coupled for movement to the control ring at least during a movement between the neutral position and the freewheeling position in order to connect or disconnect the freewheel. In particular, the blocking bodies are distributed on a common pitch circle in the circumferential direction and/or arranged spaced with respect to one another. The control ring rests in sections on each of the blocking bodies in order to simultaneously insert all blocking bodies into the associated receiving pocket when the sliding sleeve is moved from the freewheeling position to the neutral position. The control ring preferably has an inner ring and an outer ring, which are radially spaced apart from one another and are arranged coaxially and/or concentrically in relation to one another with respect to the main axis of rotation. The inner ring and the outer ring are preferably connected to one another via a plurality of connecting webs distributed in the circumferential direction. In particular, the blocking bodies and/or the blocking contour pass through the control ring in the freewheeling position between the inner ring and outer ring. The blocking bodies each have a main body section with at least one outer, radially outwardly directed contact section for contacting the outer ring and at least one inner, radially inwardly directed contact section for contacting the inner ring. The main body section is preferably arranged between the inner ring and the outer ring, wherein the blocking bodies in the freewheeling position with the main body section engage with the blocking contour in the direction of rotation. The control ring allows the blocking bodies to be inserted or removed together in a simple manner when the sliding sleeve moves, which further improves the switching process.

In one specification, the control ring has one or more radially outwardly directed control rods, which are each guided axially in a control slot formed in the first clutch partner. The sliding sleeve is coupled for movement with the control ring via the control rod. The freewheel is preferably received radially within the first clutch partner, wherein the at least one control rod extends through the control slot in the radial direction outwards or in the direction of the sliding sleeve. Preferably, the plurality of control rods are evenly distributed in the circumferential direction and/or arranged at a distance from one another. The control slot is designed as a cut-out, slot, recess, opening or the like that extends in the axial direction with respect to the main axis of rotation. In particular, the control ring is guided in a straight line in the associated control slot via the at least one control rod in the axial direction and is held in a rotationally fixed manner in the circumferential direction. A clutch assembly is thus proposed which is characterized by a particularly compact structure. In particular, the freewheel can be integrated into the first clutch partner for this purpose, with wherein freewheel is controlled in a simple manner by the sliding sleeve via the control rods.

In a further specific implementation, the sliding sleeve has one or more control contours on its inner circumference. The control contour is and/or can be supported on the control rod in the axial direction, in particular in the direction of the neutral position, in order to take along the control ring in the axial take direction during a movement, in particular an axial movement, of the sliding sleeve from the freewheeling position into the neutral position against the spring force. In particular, the sliding sleeve has an associated control contour for each control rod. The control contour can be designed as a radially inwardly directed web, lug or tooth. Optionally, the control contour can engage with the second clutch partner in the blocking position in order to connect the two clutch partners to one another in a torque-transmitting manner. A sliding sleeve is therefore proposed, which is coupled for movement with the control ring in a simple manner via a form-fit connection.

In a further development, the clutch assembly has a locking ring. The first clutch partner has a circumferential receiving groove and the sliding sleeve has a circumferential retaining groove, wherein the locking ring is mounted in the receiving groove and engages in sections in the retaining groove in the neutral position in order to secure the sliding sleeve axially on the first clutch partner in the neutral position. In particular, the locking ring has the function of securing the sliding sleeve in the neutral position against axial movement due to the spring forces acting on the control ring. Optionally, the locking ring is used to secure the entire structural unit, in particular at least the freewheel, against loss after assembly. Preferably, the locking ring can be deformed into the receiving groove when the sliding sleeve is subjected to an axial actuating force in order to release the sliding sleeve in the direction of the freewheeling position. Particularly preferably, the locking ring is radially preloaded during an axial displacement into the freewheeling position and/or the blocking position, wherein the locking ring automatically latches into the retaining groove when the neutral position is reached. The locking ring is designed in particular as a slotted snap ring. A further advantage is that by axially securing the sliding sleeve, the energy supply to the actuator can be interrupted in the neutral position, as a result of which a particularly efficient and energy-saving clutch assembly is proposed. Furthermore, the locking ring can prevent or reduce drag torque between the sliding sleeve and the shift fork in the neutral position.

In a further specification, the retaining groove and/or the locking ring has a run-on slope. When the sliding sleeve is axially moved from the neutral position to the freewheeling position, the locking ring can be deformed radially into the receiving groove via the run-on slope, such that the sliding sleeve can be freely moved in the direction of the neutral position and the blocking position or the axial securing of the sliding sleeve is canceled. In particular, the run-on slope has a rising course in the direction of the freewheeling position, such that the degree of deformation increases with increasing displacement of the sliding sleeve from the neutral position towards the freewheeling position. The run-on slope is preferably formed in the axial direction on the groove flank of the retaining groove. On the other hand, the groove flank of the retaining groove opposite the run-on slope extends straight, in particular in a radial plane of the main axis of rotation, whereby an axial end stop for the sliding sleeve is defined beyond the neutral position. Alternatively, the run-on slope or optionally additionally a further run-on slope is formed on an outer diameter of the locking ring. A sliding sleeve is therefore proposed which ensures automatic release of the axial lock in the case of actuation in the neutral position. In addition, the effort required by the actuator to overcome the holding force applied by the locking ring is significantly reduced.

In a further specific implementation, the locking ring defines an end stop for the control ring in an axial opposite direction when the sliding sleeve is arranged in the freewheeling position and/or the blocking position. For this purpose, the locking ring is arranged in front of the control ring, in particular in the region of the guide slot, when viewed in the axial direction. In other words, the locking ring is arranged on the first clutch partner in such a way that axial movement of the control ring in the freewheeling position, in particular in the axial opposite direction, is limited by the locking ring. Preferably, the locking ring extends in sections within the guide slot so that the control rod, in particular in the freewheeling position of the sliding sleeve, is and/or can be supported on the locking ring in the axial opposite direction. By axially securing the control ring in the freewheeling or blocking position, a clutch assembly is proposed which, as a pre-assembled unit, ensures a captive assembly of the freewheel, so as to dispense with an additional locking ring.

In a further embodiment, the first clutch partner has an external toothing and the second clutch partner has a locking toothing. The sliding sleeve is in rotationally fixed engagement with the external toothing via an internal toothing, wherein the internal toothing can also be brought into rotationally fixed engagement with the locking toothing when moved into the blocking position in order to couple the two clutch partners to one another in a rotationally fixed manner. The external toothing, the internal toothing and the locking toothing are each designed as a spur toothing aligned in the axial direction with respect to the main axis of rotation, such that the sliding sleeve and the first or second clutch partner are movable relative to one another in the axial direction with respect to the main axis of rotation and are coupled to one another in a rotationally fixed manner in the circumferential direction. In particular, at least the internal toothing of the sliding sleeve and the external toothing of the first clutch partner are formed by webs or teeth or grooves that extend axially with respect to the main axis of rotation. The sliding sleeve preferably has a roof-like toothing axially on the side of the internal toothing directed towards the second clutch partner. Alternatively or optionally additionally, the second clutch partner has a roof-like toothing axially on the side of the locking toothing directed towards the sliding sleeve.

The disclosure further relates to a drivetrain having a first and a second shaft and having the clutch assembly. The first shaft is connected to the first clutch partner in a rotationally fixed manner and the second shaft is connected to the second clutch partner in a rotationally fixed manner, wherein torque transmission between the two shafts can be controlled by axially moving a sliding sleeve of the clutch assembly. In particular, the first clutch partner has a first driving toothing for a rotationally fixed connection of the first shaft, and the second clutch partner has a second driving toothing for a rotationally fixed connection of the second shaft. The drivetrain is preferably designed and/or suitable for driving a vehicle, in particular a motor vehicle. Preferably, the drivetrain is designed and/or suitable for an electric axle of the vehicle. The clutch assembly can be part of a connect or disconnect unit, for example to release an electric drive from the drive shafts of the vehicle. For this purpose, one shaft can be designed as a motor-side drive shaft and the other shaft as a wheel-side output shaft.

BRIEF DESCRIPTION OF THE DRAWINGS

Further features, advantages and effects of the disclosure arise from the following description of preferred exemplary embodiments of the disclosure. In the figures.

DETAILED DESCRIPTION

Figure 1:
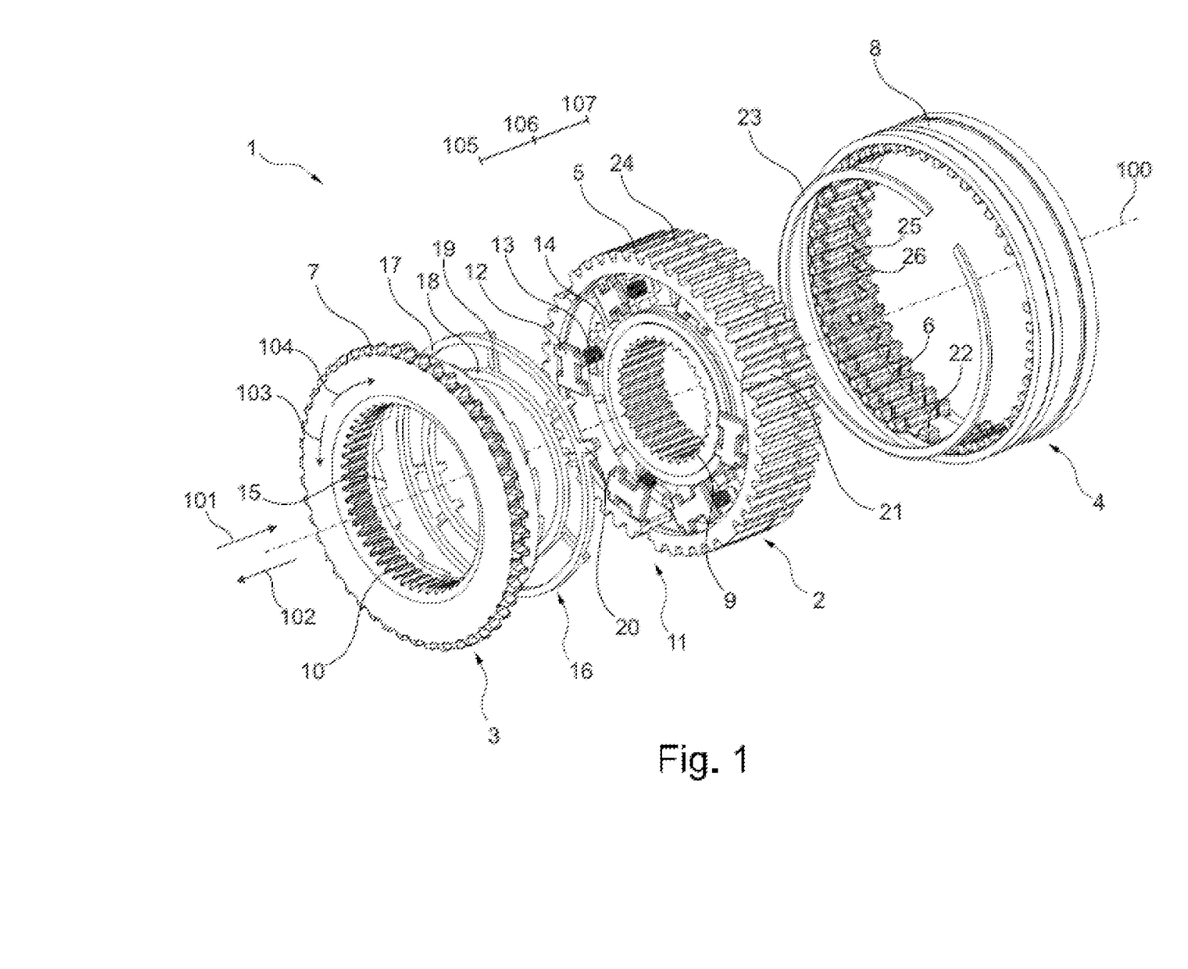
FIG. 1 shows an exploded view of a clutch assembly as an exemplary embodiment of the disclosure.

FIG. 1 shows a clutch assembly 1 in an exploded view as an exemplary embodiment of the disclosure. The clutch assembly 1 is designed as a dog clutch, wherein the clutch assembly has a first and a second clutch partner 2, 3 and a sliding sleeve 4, which are arranged coaxially with respect to one another in relation to a common main axis of rotation 100.

The first clutch partner 2 is designed as a hub, in particular a sleeve carrier, on which the sliding sleeve 4 is arranged in a rotationally fixed manner and is arranged to be movable in an axial direction 101 and an axial opposite direction 102 in relation to the main axis of rotation 100. For this purpose, the first clutch partner 2 has an external toothing 5 on the outer circumference, and the sliding sleeve 4 has an internal toothing 6 on the inner circumference, which are each designed as a spur toothing extending axially with respect to the main axis of rotation 100.

The second clutch partner 3 is designed as a coupling body which has a locking toothing 7 on its outer circumference, wherein the sliding sleeve 4 can be brought into rotationally fixed engagement with the locking toothing 7 during an axial movement in the axial opposite direction 102 along the main axis of rotation 100 in order to couple the two clutch partners 2, 3 to one another in a rotationally fixed manner. For example, the first and second clutch partners 2, 3 are each designed as a spur gear or a spur-toothed gear.

The sliding sleeve 4 can be connected to an actuator (not shown), which applies an actuating force to the sliding sleeve 4 in the axial direction with respect to the main axis of rotation 100. In order to move the sliding sleeve 4 in the axial direction 101 or the axial opposite direction 102 during a rotation about the main axis of rotation 100, the sliding sleeve 4 has a circumferential groove 8 on its outer circumference, into which, for example, a shift fork of the actuator can engage.

The first and second clutch partners 2, 3 are each connected in to a rotating component, for example a shaft, in a rotationally fixed manner. For this purpose, the first clutch partner 2 has a first driving toothing 9 on the inner circumference and the second clutch partner 3 has a second driving toothing 10 on the inner circumference. The first and second driving toothings 9, 10 are each designed as a spline. For example, the first clutch partner 2 can be arranged on an output side and the second clutch partner 3 can be arranged on a drive side.

The clutch assembly 1 also has a switchable freewheel 11, which is arranged axially between the two clutch partners 2, 3 and is accommodated radially within the first clutch partner 2. The freewheel 11 has a plurality of, in particular six, blocking bodies 12 distributed around the main axis of rotation 100, each of which is resiliently supported via a spring 13 in a receiving pocket 14 formed on the first clutch partner 2. The receiving pockets 14 are each designed as depressions introduced into the front side of the first clutch partner 2, which substantially form a negative contour of the blocking bodies 12. The blocking bodies 12 are movable in the axial direction and accommodated form-fittingly in the circumferential direction in the associated receiving pocket 14.

The second clutch partner 3 has, on its axial end face facing the blocking bodies 12, a cylindrical extension with a ramp-shaped blocking contour 15, with which the blocking bodies 12 can interact form-fittingly in a connected state of the freewheel 11 in a direction of rotation 103 of the second clutch partner 3. In an opposite direction of rotation 104 that is directed counter to the direction of rotation 103, the first and the second clutch partners 2, 3 can be rotated relative to one another, with the blocking bodies 12 sliding on the blocking contour 15 when the freewheel 11 is connected. The blocking bodies 12 are designed as pawls and the blocking contour 15 is formed by a plurality of sawtooth ramps rising in the circumferential direction.

The freewheel 11 also has an axially movable control ring 16 for controlling the freewheel 11, which is arranged coaxially with respect to the two clutch partners 2, 3 in relation to the main axis of rotation 100 and is supported in the axial direction 101 on the blocking bodies 12 against a spring force of the springs 13. The control ring 16 is formed by an outer ring 17 and an inner ring 18 arranged concentrically thereto, which are spaced apart from one another in the radial direction and are connected to one another via a plurality of connecting webs 19.

The control ring 16 has three control rods 20 arranged on the outer circumference of the outer ring 17, which are each accommodated in a control slot 21 introduced into the external toothing 5 of the first clutch partner 2. The control ring 16 is guided in a straight line in the axial direction via the control rods 20 in the control slot 21 and is supported in a rotationally fixed manner in the circumferential direction. The control rods 20 pass through the control slot 21 in the radial direction and are coupled for movement with a control contour 22 arranged on the inner circumference of the sliding sleeve 4. The control contour 22 is designed as a radially inwardly directed tooth, which is or can be supported in the axial direction 101 on the associated control rod 20 in each case in order to take the control ring 16 along when the sliding sleeve 4 is moved.

The sliding sleeve 4 can be moved along the main axis of rotation 100 into a blocking position 105, a freewheeling position 106 and a neutral position 107. In the blocking position 105, the sliding sleeve 4 is in engagement via the internal toothing 6, on the one hand, with the external toothing 5 and, on the other hand, with the locking toothing 7, such that the two clutch partners 3, 4 are connected to one another in a rotationally fixed manner in the direction of rotation 103 and the opposite direction of rotation 104. In the freewheeling position 106, the sliding sleeve 4 engages exclusively with the external toothing 5 via the internal toothing 6, wherein the freewheel 11 is connected at the same time, so that the two clutch partners 3, 4 are connected to one another in a rotationally fixed manner in the direction of rotation 103 and are rotatable relative to one another in the opposite direction of rotation 104. In the neutral position 107, the sliding sleeve 4 engages exclusively with the external toothing 5 via the internal toothing 6, wherein the freewheel 11 is disconnected at the same time, so that the two clutch partners 3, 4 can be rotated relative to one another in the direction of rotation 103 and in the opposite direction of rotation 104.

The clutch assembly 1 has a locking ring 23, which is used to axially secure the sliding sleeve 4 in the neutral position 107. The first clutch partner 2 has a circumferential receiving groove 24 on its outer circumference, in which the locking ring 23 is mounted. The sliding sleeve 4 has, on its inner circumference, a retaining groove 25 which is introduced circumferentially in sections in the internal toothing 6, wherein the locking ring 23 engages in sections in the retaining groove 25 in the neutral position 107 in order to secure the sliding sleeve 4 form-fittingly on the first clutch partner 2 in the axial direction.

The retaining groove 25 has a run-on slope 26 rising in the axial opposite direction 102, wherein the locking ring 23 is deformed radially into the receiving groove 24 via the run-on slope 26 when the sliding sleeve 4 is moved from the neutral position 107 in the axial opposite direction 102 in order to ensure the form-fit connection between the sliding sleeve 4 and the first clutch partner 2. For this purpose, the locking ring 23 is designed as a circumferentially interrupted snap ring, which undergoes a change in diameter upon radial deformation.

Figure 2:
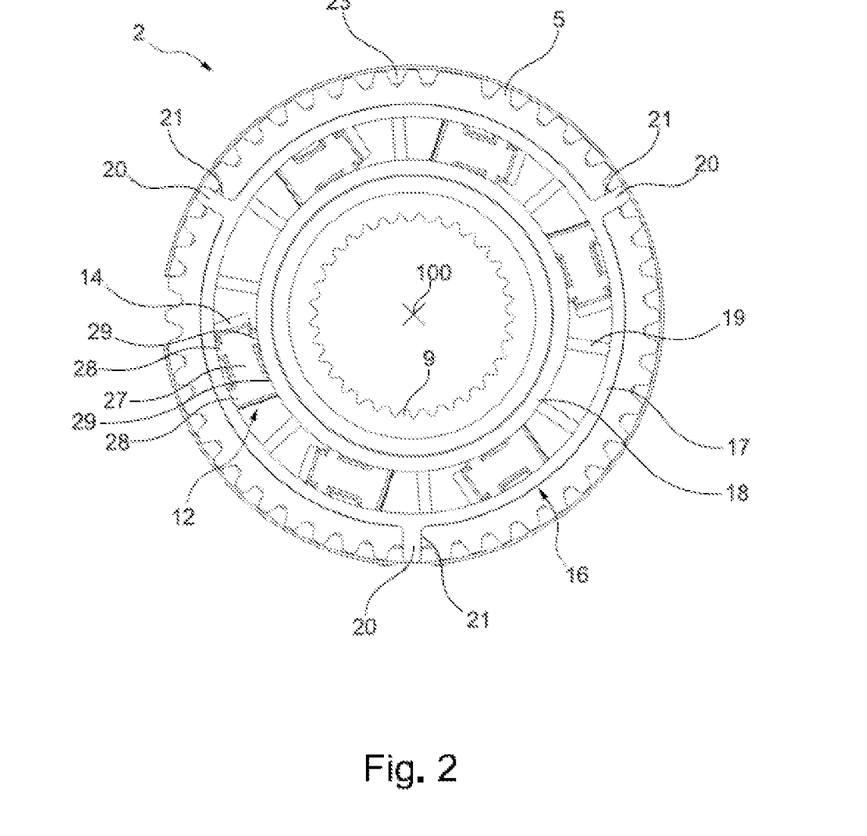
FIG. 2 shows an axial view of a first clutch partner of the clutch assembly described in FIG. 1.

FIG. 2 shows the first clutch partner 2 in an axial view with respect to the main axis 100. The blocking bodies 12 accommodated in the receiving pockets 14 each have a main body section 27, wherein two radially outwardly directed contact sections 28 and two radially inwardly directed contact sections 29 adjoin the main body section 27. The control ring 16 is supported in the axial direction 101, as described in FIG. 1, with the outer ring 17 on the outer contact sections 28 and with the inner ring 18 on the inner contact sections 29 of the blocking bodies 12.

The main body sections 27 are each arranged radially between the outer and inner rings 17, 18, wherein the blocking contour 15, as described in FIG. 1, being arranged in the freewheeling position 106 of the sliding sleeve 4 between the outer and inner rings 17, 18, and the blocking body 12 can be brought into form-fitting engagement with the main body sections 27 when the second clutch partner 3 is rotated in the direction of rotation 103. When the control ring 16 is moved axially in the axial direction 101 or into the neutral position 107, the blocking bodies 12 are inserted into the receiving pockets 14 via the control ring 16 against the spring force, such that the blocking bodies 12 are sunk in the receiving pocket 14 and/or are disengaged from the blocking contour 15.

Figure 3:
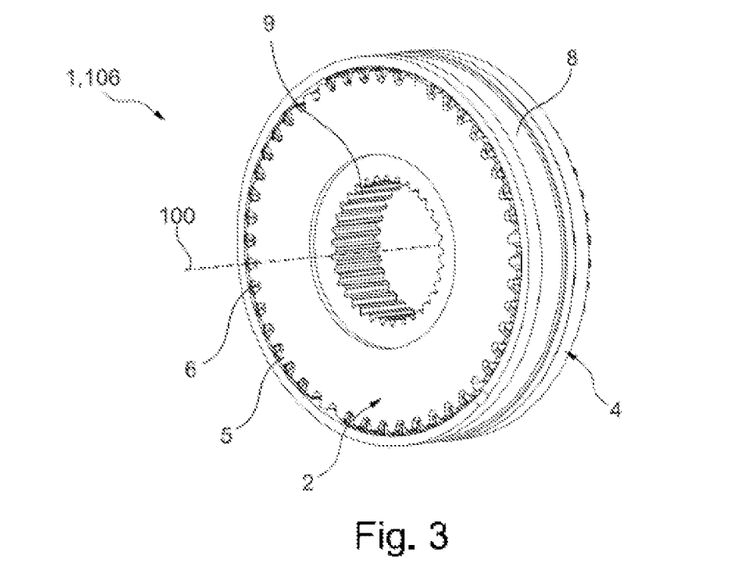
FIG. 3 shows a perspective rear view of the clutch assembly.
Figure 4:
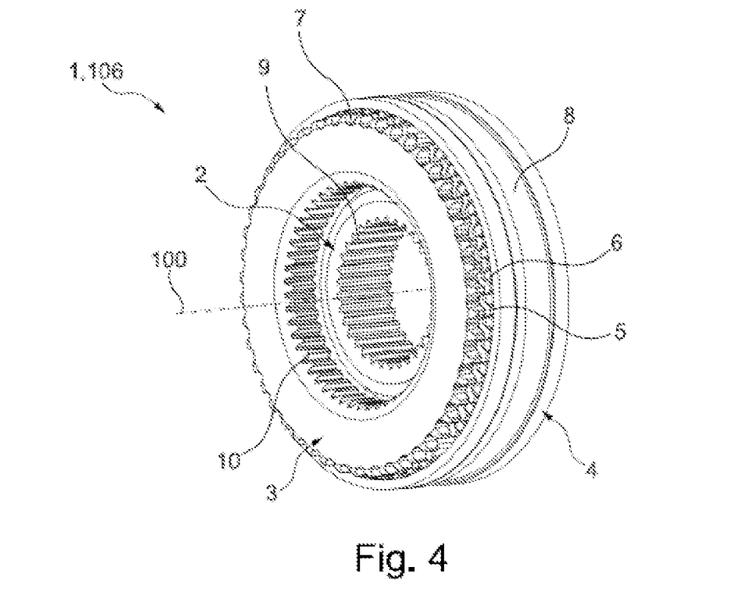
FIG. 4 shows a perspective front view of the clutch assembly.

FIGS. 3 and 4 show the clutch assembly 1 in the assembled state, each in a different perspective view. The clutch assembly 1 is shown in FIG. 3 viewed obliquely from behind and in FIG. 4 viewed obliquely from the front. In the illustrations shown, the sliding sleeve 4 is in the freewheeling position 106, wherein the internal toothing 6 and the locking toothing 7 are disengaged and the freewheel 11 is connected, as already described in FIG. 1.

Figure 5:
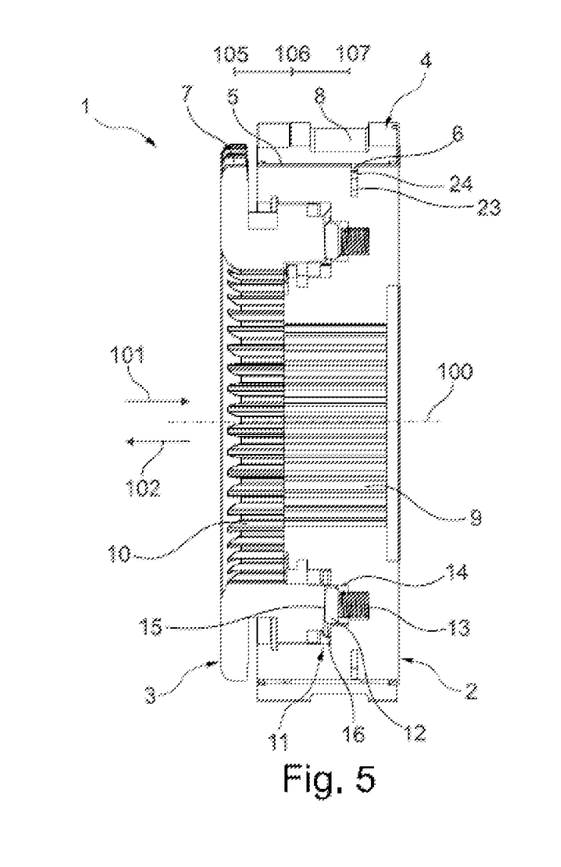
FIG. 5 shows a sectional view of the clutch assembly in a freewheeling position.
Figure 6:
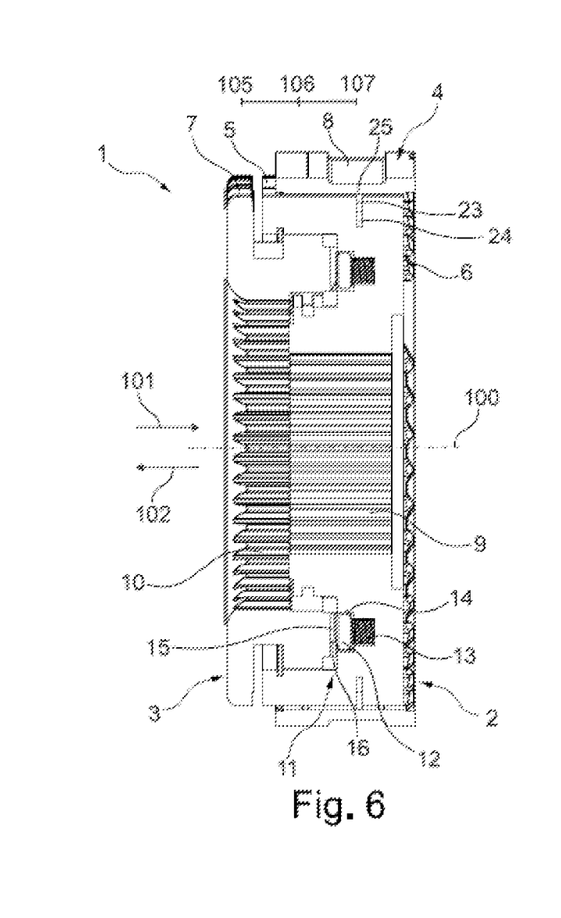
FIG. 6 shows the clutch assembly in the same view as FIG. 5 in a neutral position.

FIGS. 5 and 6 each show a sectional view of the clutch assembly 1 along the main axis of rotation 100. In FIG. 5 the sliding sleeve 4 is arranged in the freewheeling position 106 and in FIG. 6 the sliding sleeve 4 is arranged in the neutral position 107. For example, a torque of a shaft (not shown), which is in engagement with the second driving toothing 10 is transmitted to the second clutch partner 3, wherein, depending on the position of the sliding sleeve 4, the torque can be transmitted to the first clutch partner 2 and to a shaft, not shown, which is engaged with the first driving toothing 9.

In the freewheeling position 106, the blocking bodies 12 are partially removed from the receiving pocket 14 in the axial opposite direction 102 so that, for example, a torque can be transmitted to the first clutch partner 2 via the receiving pockets 14. The blocking bodies 12 are acted upon by the spring force of the springs 13 in the direction of the blocking contour 15, the torque being transmitted from the second clutch partner 3 to the first clutch partner 2 via the freewheel 11, according to the direction of rotation, when the blocking bodies 12 are pressed into the blocking contour 15 by the springs 13. When the direction of rotation is reversed, the blocking contour 15 slides off the blocking bodies 12 due to the ramp shape, wherein torque transmission is interrupted. The locking ring 23 is deformed into the receiving groove 24 in the freewheeling position 106 or is held under preload in the receiving groove 24 by the internal toothing 6.

When the sliding sleeve 4 is moved into the neutral position 107, the control ring 16 is moved in the axial direction 101 by the control contour 22, as shown in FIG. 1, wherein the blocking bodies 12 are engaged into the receiving pockets 14 via the control ring 16 while the springs 13 are compressed. The blocking bodies 12 are sunk into the receiving pockets 14 relative to the blocking contour 15, such that the two clutch partners 2, 3 are decoupled from one another regardless of the direction of rotation. By compressing the springs 13, the spring force acting on the control ring 16 is increased, so the effort required to hold the sliding sleeve 4 in the neutral position 107 is also increased.

For this reason, the sliding sleeve 4 is additionally held axially by the locking ring 23 in the neutral position 107 so that the spring forces acting on the control ring 16 can be diverted via the locking ring 23 into the first clutch partner 2. For this purpose, when the neutral position 107 is reached, the locking ring 23 automatically latches into the retaining groove 25 due to the preload. Furthermore, the locking ring 23 is used to fix the individual components of the freewheel 11 after assembly. In addition, in the neutral position, a drag torque between the sliding sleeve 4 and the shift fork of the actuator is reduced.

A clutch assembly 1 is therefore proposed which can be switched easily between the individual positions 105, 106, 107 under load. For example, the clutch assembly 1 with the switchable freewheel 11 can thus be easily integrated as part of a disconnect clutch into a drivetrain of a vehicle.

Figure 7:
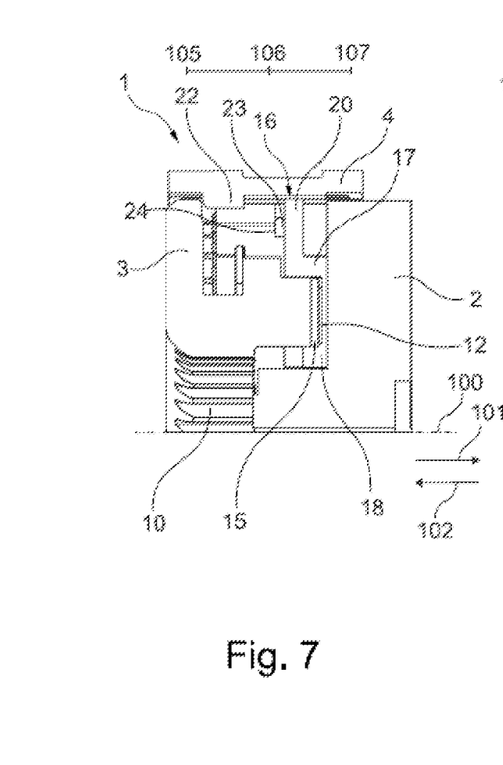
FIG. 7 shows a sectional view of an alternative embodiment of the clutch assembly in a blocking position.
Figure 8:
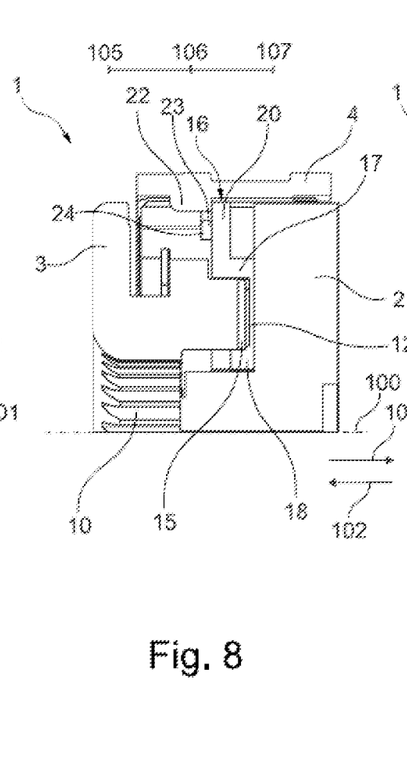
FIG. 8 shows the clutch assembly in the same view as FIG. 7 in a freewheeling position.
Figure 9:
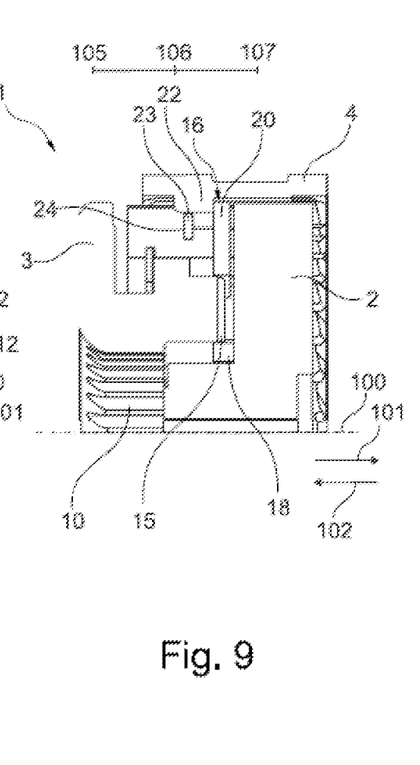
FIG. 9 shows the clutch assembly in the same view as FIG. 7 in a neutral position.

FIGS. 7 to 9 each show an alternative embodiment of the clutch assembly 1 in a sectional view along the main axis of rotation 100, wherein the sliding sleeve 4 is arranged in the blocking position 105 in FIG. 7, in the freewheeling position 106 in FIG. 8 and in the neutral position 107 in FIG. 9. In comparison to the previously described embodiment, the locking ring 23 is arranged in front of the control ring 16 when viewed in the axial direction 101 and thus in the axial opposite direction 102 forms an axial end stop for the control ring 16 or the control rods 20.

The sliding sleeve 4 is supported in the axial direction 101 via the control contour 22 on the control rod 20, the control rod 20 remaining supported on the locking ring 23 when the sliding sleeve 4 is moved from the freewheeling position 106 to the blocking position 105, such that the control contour 22 is set apart or is spaced apart from the control rod 20, as shown in FIG. 7. When the sliding sleeve 4 is moved from the blocking position 105 to the freewheeling position 106, the control contour 22 is again attached to or supported on the control rod 20 in the axial direction 101 (as shown in FIG. 8), wherein the control ring 16 is taken along in the axial direction 101 by the control contour 22 when the sliding sleeve 4 is further moved into the neutral position 107. The locking ring 23 is thus used, on the one hand, to form a defined end position for the control ring 16 and to secure the freewheel 11, in particular the control ring 16 together with the blocking body 12 and springs 13, during pre-assembly on the first clutch partner 2.

As can be seen from this exemplary embodiment, at least in the freewheeling position 106, the blocking contour 15 passes through the control ring 16 in the axial direction 101 or is arranged in the radial direction between the outer and inner rings 17, 18 so that the blocking bodies 12 are brought into contact with the blocking contour 15. For example, the control ring 16 can additionally be guided and/or centered in the axial direction on the blocking contour 15 or cylindrical extension via the outer and inner rings 17, 18.

LIST OF REFERENCE SIGNS

1 Clutch assembly
2 First clutch partner
3 Second clutch partner
4 Sliding sleeve
5 External toothing
6 Internal toothing
7 Locking toothing
8 Groove
9 First driving toothing
10 Second driving toothing
11 Freewheel
12 Blocking body
13 Spring
14 Receiving pocket
15 Blocking contour
16 Control ring
17 Outer ring
18 Inner ring
19 Connecting web
20 Control rod
21 Control slot
22 Control contour
23 Locking ring
24 Receiving groove
25 Retaining groove
26 Run-on slope
27 Main body section
28 Outer contact section
29 Inner contact section
100 Main axis of rotation
101 Axial direction
102 Axial opposite direction
103 Direction of rotation
104 Opposite direction of rotation
105 Blocking position
106 Freewheeling position
107 Neutral position

The invention claimed is:

1. A clutch assembly, comprising:
first and second clutch partners;
a switchable freewheel, wherein the freewheel is arranged between the first and second clutch partners to selectively couple the first and second clutch partners to each other, wherein the freewheel includes a plurality of spring-loaded blocking bodies which are fixed to the first clutch partner, at least in the circumferential direction, and which selectively interact form-fittingly with a ramp-shaped blocking contour arranged on the second clutch partner; and
a sliding sleeve which is movable coaxially with respect to the first and second clutch partners, for controlling the clutch assembly, wherein the first and second clutch partners in a blocking position of the sliding sleeve are connected to each other in a rotationally fixed manner in a first direction of rotation and in a second direction of rotation that is opposite the first direction of rotation via the sliding sleeve, in a freewheeling position of the sliding sleeve the first and second clutch partners are connected to each other in a rotationally fixed manner via the freewheel in the first direction of rotation and are rotatably relative to each other in the second direction of rotation, and in a neutral position of the sliding sleeve the blocking bodies are kept disengaged with respect to the blocking contour by the sliding sleeve, such that the first and second clutch partners are rotatable relative to each other in the first and second directions of rotation.

2. The clutch assembly of claim 1, wherein the freewheel is arranged axially between the first and second clutch partners with respect to a main axis of rotation, and wherein the first clutch partner on an axial end face has a plurality of receiving pockets for receiving the blocking bodies and the second clutch partner has the blocking contour on an axial end face opposite the blocking bodies.

3. The clutch assembly of claim 2, wherein the freewheel includes a control ring which is coupled for movement in the axial direction with the sliding sleeve and which, in an axial direction with respect to the main axis of rotation, rests against the blocking bodies counter to a spring force in order to transmit an axial movement of the sliding sleeve to the blocking bodies.

4. The clutch assembly of claim 3, wherein the control ring has at least one radially outwardly directed control rod which is guided axially in a control slot formed in the first clutch partner, wherein the sliding sleeve is coupled for movement with the control ring via the control rod.

5. The clutch assembly of claim 4, wherein the sliding sleeve at its inner circumference has at least one control contour, which is supported in the axial direction on the control rod in order to move the control ring in the axial direction at least from the freewheeling position to the neutral position against the spring force during a movement of the sliding sleeve.

6. The clutch assembly of claim 1, further comprising:
a locking ring, wherein the first clutch partner has a circumferential receiving groove and the sliding sleeve has a circumferential retaining groove, and wherein the locking ring is mounted in the receiving groove and, in the neutral position of the sliding sleeve, engages in sections in the retaining groove in order to secure the sliding sleeve in the neutral position axially on the first clutch partner.

7. The clutch assembly of claim 6, wherein at least one of the retaining groove and the locking ring has a run-on slope, and wherein the locking ring is deformed radially into the receiving groove via the run-on slope when the sliding sleeve is axially moved from the neutral position into the freewheeling position, such that the sliding sleeve is freely movable in the direction of the neutral position and the blocking position.

8. The clutch assembly of claim 6, wherein the locking ring defines an end stop for a control ring in an axial opposite direction when the sliding sleeve is arranged in at least one of the freewheeling position and the blocking position.

9. The clutch assembly of claim 1, wherein the first clutch partner has an external toothing and the second clutch partner has a locking toothing, and wherein the sliding sleeve is in rotationally fixed engagement with the external toothing via an internal toothing and, when moved into the blocking position, is in rotationally fixed engagement with the locking toothing via the internal toothing to couple the first and second clutch partners to each other in a rotationally fixed manner.

10. A drivetrain, comprising:
a first shaft;
a second shaft; and a clutch assembly, comprising:
  a first clutch partner connected to the first shaft in a rotationally fixed manner;
  a second clutch partner connected to the second shaft in a rotationally fixed manner, wherein the first and second shafts and the first and second clutch partners are operable to rotate about a main axis;
  a switchable freewheel arranged between the first and second clutch partners, configured to selectively couple the first and second clutch partners to each other, and having a plurality of spring-loaded blocking bodies that are circumferentially fixed relative to the first clutch partner and configured to selectively interact with a blocking contour arranged on the second clutch partner; and
  a sliding sleeve operable to move axially along the main axis relative to the first and second clutch partners between a blocking position, wherein the first and second clutch partners are connected to each other in a rotationally fixed manner in a first direction of rotation and a second direction of rotation that is opposite the first direction of rotation via the sliding sleeve, a freewheeling position, wherein the first and second clutch partners are connected to each other in a rotationally fixed manner via the freewheel in the first direction of rotation and are rotatable relative to each other in the second direction of rotation, and a neutral position, wherein the plurality of spring-loaded blocking bodies are kept disengaged with respect to the blocking contour by the sliding sleeve, such that the first and second clutch partners are rotatably relative to each other in the first and second directions of rotation.

11. The drivetrain of claim 10, wherein the freewheel is arranged axially between the first and second clutch partners with respect to the main axis of rotation, and wherein the first clutch partner on an axial end face has a plurality of receiving pockets for receiving the blocking bodies, and the second clutch partner has the blocking contour on an axial end face opposite the blocking bodies.

12. The drivetrain of claim 10, wherein the freewheel includes a control ring which is coupled for movement in the axial direction with the sliding sleeve and which, in an axial direction with respect to the main axis of rotation, rests against the blocking bodies counter to a spring force in order to transmit an axial movement of the sliding sleeve to the blocking bodies.

13. The drivetrain of claim 12, wherein the control ring has at least one radially outwardly directed control rod which is guided axially in a control slot formed in the first clutch partner, wherein the sliding sleeve is coupled for movement with the control ring via the control rod.

14. The drivetrain of claim 13, wherein the sliding sleeve at its inner circumference has at least one control contour, which is supported in the axial direction on the control rod in order to move the control ring in the axial direction at least from the freewheeling position to the neutral position against the spring force during a movement of the sliding sleeve.

15. The drivetrain of claim 10, further comprising:
  a locking ring, wherein the first clutch partner has a circumferential receiving groove and the sliding sleeve has a circumferential retaining groove, and wherein the locking ring is mounted in the receiving groove and, in the neutral position of the sliding sleeve, engages the retaining groove in order to secure the sliding sleeve in the neutral position axially on the first clutch partner.

16. The drivetrain of claim 15, wherein at least one of the retaining groove and the locking ring has a run-on slope, and wherein the locking ring is deformed radially into the receiving groove via the run-on slope when the sliding sleeve is axially moved from the neutral position into the freewheeling position, such that the sliding sleeve is freely movable in the direction of the neutral position and the blocking position.

17. The drivetrain of claim 16, wherein the locking ring defines an end stop for a control ring in an axial opposite direction when the sliding sleeve is arranged in at least one of the freewheeling position and the blocking position.

18. The drivetrain of claim 10, wherein the first clutch partner has an external toothing and the second clutch partner has a locking toothing, and wherein the sliding sleeve is in rotationally fixed engagement with the external toothing via an internal toothing and, when moved into the blocking position, is in rotationally fixed engagement with the locking toothing via the internal toothing to couple the first and second clutch partners to each other in a rotationally fixed manner.

19. The drivetrain of claim 10, wherein, in the freewheeling position of the sliding sleeve, rotation of the first clutch partner in the second direction of rotation relative to the first clutch partner prompts interaction between the plurality of spring-loaded blocking bodies and the blocking contour resulting in axial reciprocation of the spring-loaded blocking bodies relative to the first clutch partner.

* * * * *